United States Patent [19]

Francois

[11] Patent Number: 5,193,645
[45] Date of Patent: Mar. 16, 1993

[54] METHOD FOR COOLING REDUCTION GEARS LUBRICATED WITH SPRAYED OIL AND IMPLEMENTATION EQUIPMENT

[75] Inventor: Roland C. Francois, Cabries, France
[73] Assignee: Aerospatiale Societe Nationale Industrielle, Paris, France
[21] Appl. No.: 841,122
[22] Filed: Feb. 25, 1992

[30] Foreign Application Priority Data

Mar. 7, 1991 [FR] France .................. 91 02729

[51] Int. Cl.⁵ ............................................. F16H 57/02
[52] U.S. Cl. ........................ 184/6.12; 184/6.24; 184/6.26; 184/59; 55/203; 74/467; 74/606 A
[58] Field of Search ............ 184/6.12, 6.23, 6.21, 184/6.22, 6.24, 6.11, 6.26, 104.1, 104.3, 6.18, 58, 59, 76; 74/467, 606 A; 55/203

[56] References Cited

U.S. PATENT DOCUMENTS

| | | | |
|---|---|---|---|
| 1,702,939 | 2/1929 | Greenfield | 184/58 |
| 2,315,317 | 3/1943 | Copp et al. | 74/606 A |
| 2,325,647 | 8/1943 | Adamson | 74/606 A |
| 2,481,914 | 9/1949 | Eastman et al. | 74/606 A |
| 3,135,353 | 6/1964 | Orsini | 184/6.12 |
| 3,786,812 | 6/1973 | Wellauer | 74/606 A |
| 5,064,456 | 11/1991 | Gantzer | 184/6.12 |

FOREIGN PATENT DOCUMENTS

| | | | |
|---|---|---|---|
| 0931324 | 7/1955 | Fed. Rep. of Germany | 184/6.23 |
| 1091588 | 10/1960 | Fed. Rep. of Germany | 184/6.12 |

Primary Examiner—Ira S. Lazarus
Assistant Examiner—Alan B. Cariaso
Attorney, Agent, or Firm—Nikaido, Marmelstein, Murray & Oram

[57] ABSTRACT

The cooling method consists of sucking up inside the reduction gear previously filtered air which, when traversing the reduction gear, is mixed with the spray of lubricating oil so as to collect its calories and reject it outside after having purified it from the oil it contains. The equipment incorporates one or several air intakes provided with filters and an extraction fan driven by the reduction gear and provided with means for collecting and draining the oil. The application of this method is for reduction gears lubricated with sprayed oil and particularly for helicopter gearboxes.

7 Claims, 2 Drawing Sheets

METHOD FOR COOLING REDUCTION GEARS LUBRICATED WITH SPRAYED OIL AND IMPLEMENTATION EQUIPMENT

FIELD OF THE INVENTION

The invention concerns mechanical high-powered reduction gears with a high reduction rate and more particularly a method to cool these reduction gears, as well as the equipment integrated with said reduction gears so as to implement said method.

BACKGROUND OF THE INVENTION

Mechanical reduction gears transmitting high outputs are lubricated with oil under pressure by means of one or more lubrication pumps driven by gear trains moving on one main chain of the reduction gear or by an annexed drive source. These reduction gear devices need to be cooled intensely as any internal friction produces significant heating of the lubrication oil which, if it becomes excessive, diminishes the lubricating power of the heated or disintegrated oil, thus compromising the reliability of the devices and resulting in a falling off of the mechanical characteristics of materials subjected to high temperatures.

So as to ensure this cooling, an air/oil exchanger is generally used, the oil circulating under pressure inside that exchanger. On land or aeronautical vehicles, heat exchange is effected with air blown through a radiator, either by a ramming intake if the vehicle continuously has sufficient speed, or by a fan when the output to be evacuated is high and the vehicle has no actual speed during certain usage phases, this applying when a helicopter is hovering.

With helicopters subjected to slightly less high outputs, such as less than 600 Kw, the reduction gear members may be cooled without without any exchanger, provided the exchange surfaces of the housing of the reduction gear are artificially increased and are blown so that the temperature of the oil does not exceed a threshold adversely affecting the reliability of the members or which in any event do not reach a limit beyond which they would deteriorate (about 150° C.). The absence of an exchanger is clearly an advantage as it enables costs to be significantly reduced and avoids the use of the corresponding pipes and connectors, these items of equipment being extremely vulnerable and which may result in a total loss of oil should a leak or breakage occur, the pipes and connectors needing to be laid as quickly as possible.

On the other hand, for the main gearboxes of higher-powered helicopters, for example with an output of 1000 Kw upwards, it is necessary to use one or several exchangers ventilated by one or several fans. These exchangers and their cooling circuits do, however, result in taking on additional weight which, by way of example, may be 30 Kg for a bimotor main gearbox of 2000 Kw whose intake speeds are those of turbomotors (exceeding 20,000 rmp). Apart from the fact that this additional weight is difficult to accomodate and that the exchangers in question generate risks of the oil leaking, they do introduce a metallic intermediary which complicates and slows down exchangers at the expense of their effectiveness.

SUMMARY OF THE INVENTION

The invention is able to resolve these drawbacks since it suppresses the external exchanger oil cooling circuit by proposing to integrate the cooling function in the main gearbox itself.

One object of the present invention is to provide a method for cooling a reduction gear lubricated by oil under pressure and sprayed by nozzles, wherein it consists of admitting into the reduction gear a flow of previously filtered fresh air, of directing it inside said reduction gear so as to mix it with the ambient oil spray by heating it via direct exchange with the oil and via direct contact with the reduction gear components which are heat generators, of sucking up the air/oil mixture outside the reduction gear, of purifying the air from the oil it contains and of rejecting it outside the reduction gear.

Another object of the present invention consists of a device able to implement the method for cooling a reduction gear lubricated by oil under pressure and sprayed by nozzles, wherein the reduction gear is provided first with at least one air intake equipped with filters, and secondly with an extraction fan for sucking into the reduction gear the air mixed with the oil spray and wherein means for collecting and draining the oil are provided upstream and/or at the level of the extraction fan.

The air intake is preferably covered with an intake casing with an outlet and directed downwards and closed by a wide-meshed grate.

According to one particular characteristic of the invention, the wheel of the extraction fan is driven by one of the rotating members of the reduction gear by means of a shaft and rotates inside a recovery housing communicating with the outside via an evacuation pipe.

According to the invention, a device for collecting oil consists of a deflector mounted on the shaft inside the chamber of the gearbox and upstream of the wheel, and another oil collecting and drainage device consists of an orifice provided at the bottom of the housing which communicates with an oil recovery tank via a small collector pipe.

BRIEF DESCRIPTION OF THE DRAWINGS

Other particular characteristics and advantages of the invention shall appear more readily from a reading of the following description illustrating an example of one particular embodiment with reference to the accompanying drawings on which.

DETAILED DESCRIPTION OF THE PREFERRED EMBODIMENTS

Figure 1:
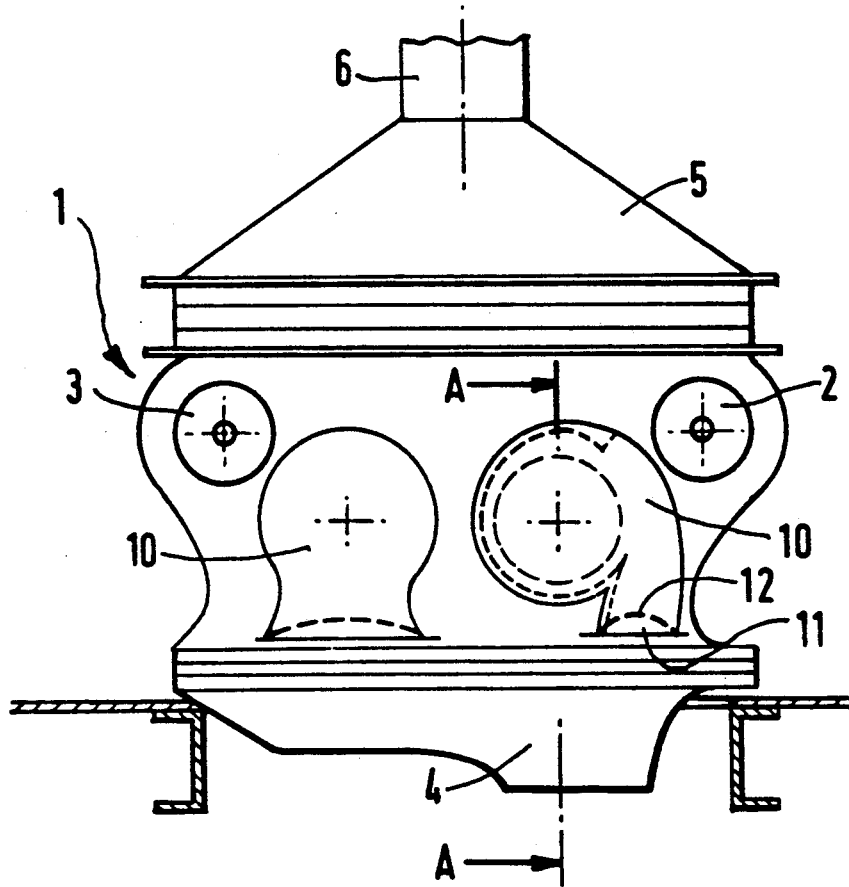
FIG. 1 shows a front view of a main helicopter gearbox according to the invention.
Figure 2:
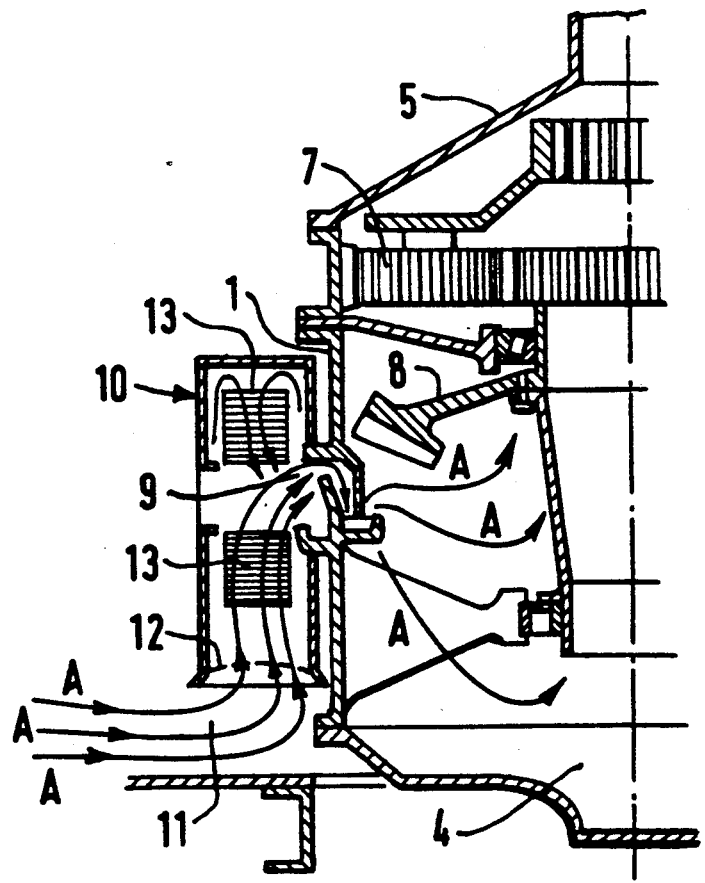
FIG. 2 is a partial cutaway view of the gearbox showing the air intake.

FIGS. 1 and 2 show a main gearbox 1 of a bimotor helicopter with two engine axes (2, 3) whose lower portion forms an oil recovery tank 4 and upper cover 5 being traversed by the drive shaft of the main rotor 6 driven by an epicycloidal reduction gear 7 with a vertical axis. Two air intakes 9 in the gearbox are provided close to the driven gear 8 of the reduction gear intermediary stage. These air intakes are each externally covered with an intake casing 10 whose outlet 11 is orientated downwards so as to avoid ingesting water and enabling it to be sprinkled. Close to the outlet, the air intake comprises a grate 12 with wide meshes intended to stop large particles or objects, such as rags, sheets, etc., from passing. Air filters 13 are also provided inside the casing. Other air intakes could be envisaged if it is desired to improve the effectiveness of cooling. It is also possible to have a single air intake, but the extraction fan then would need to be able to ensure a larger vacuum on suction. The arrows 11 on FIG. 2 show the routing of the air in the casing 10 to the air intake 9 and then inside the gearbox.

Figure 3:
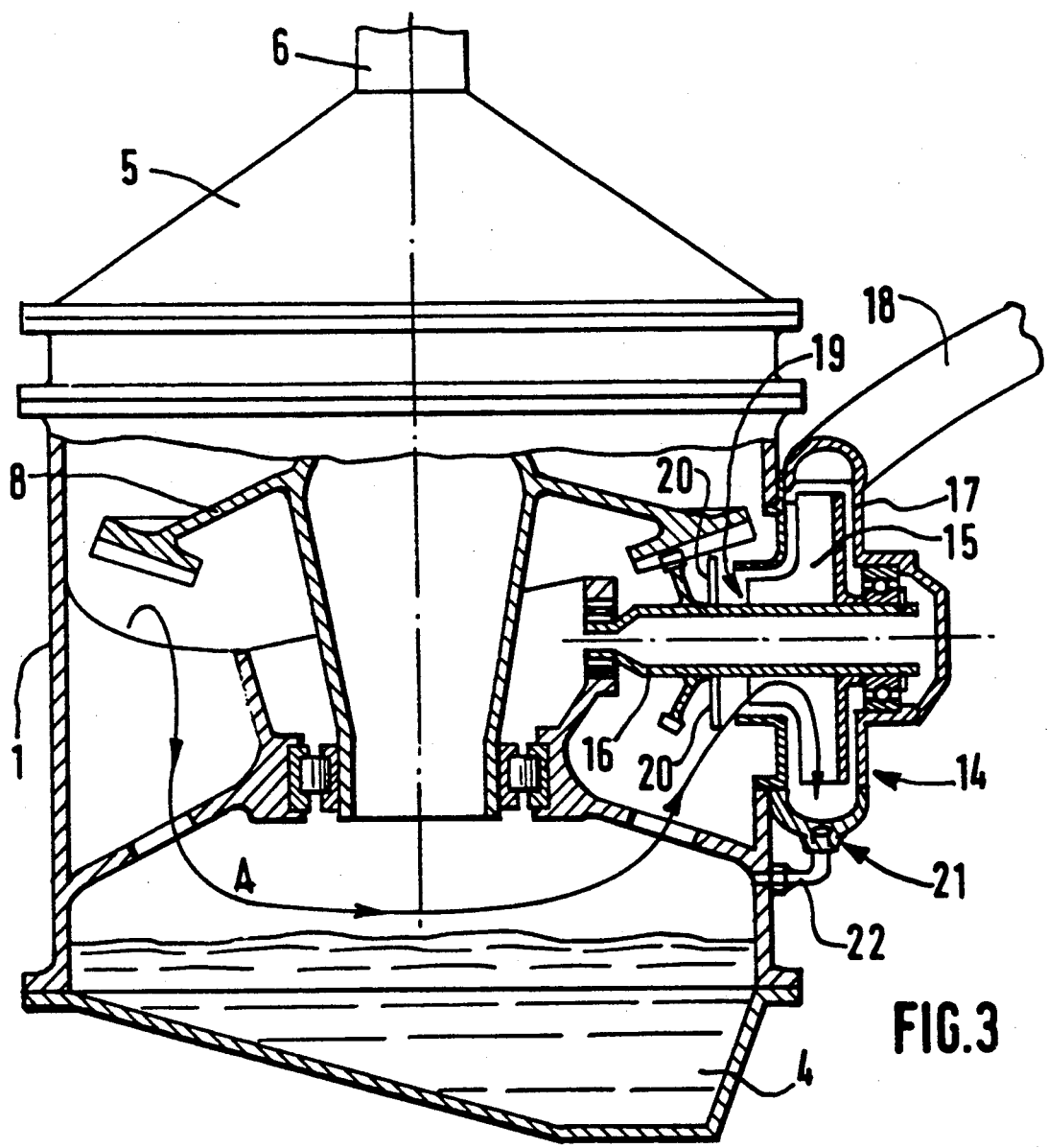
FIG. 3 is a partial cutaway view of the gearbox showing the extraction fan.
Figure 4:
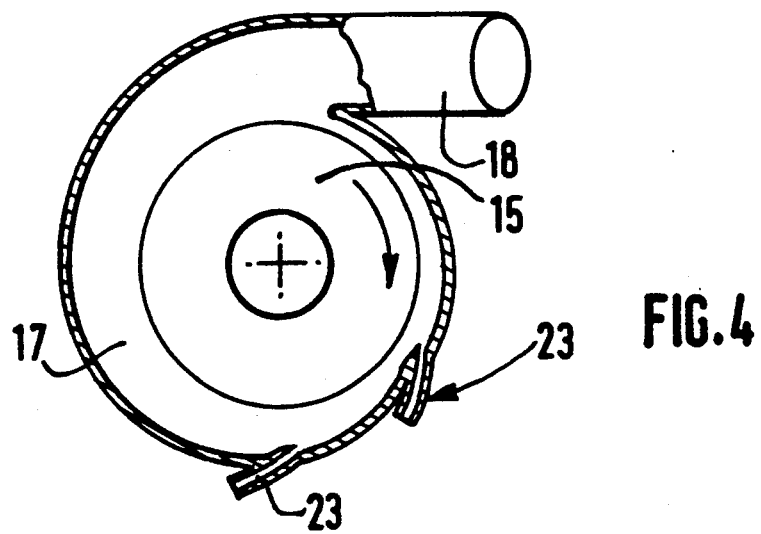
FIG. 4 is a cutaway view of said extraction fan.

FIG. 3 shows the air extraction and oil separation system. A centrifugal axial fan 14 is provided on one side of the gearbox 1, the wheel 15 of this fan being driven by the gearbox kinematics chain by means of a shaft 16. The wheel rotates inside a recovery housing 17 communicating with the outside via an evacuation pipe 18. The shaft 16 traverses an intake opening 19 making the gearbox communicate with the housing. At the inlet of the fan and close to this opening, a centrifugal deflector 20 is mounted on the shaft 16 inside the chamber 1 of the gearbox and upstream of the wheel 15. An oil drainage orifice 21 is provided at the bottom of the housing 17 and communicates with the tank 4 via a small collecting pipe 22. This device may be constituted by several recovery chutes 23 distributed at the lower portion of the housing and feeding the pipe 22, as shown in more detail on FIG. 4.

When the gearbox is functioning, the wheel 15 of the extraction fan 14 sucks up the air via the air intake 9. This air, previously filtered by the filters (12, 13) is mixed with the ambient oil spray inside the gearbox. The two fluids mix closely together at the center of the gearbox, said mixture being favored by the bursting of oil jets distributed by the nozzles which, in a known way, ensure lubrication of the gears and bearings, but also by the sprinkling of oil from top to bottom inside the box. The counter-clockwise circulation of the air (arrows A) thus participates in cooling the mixture. Moreover, the air directly cools the heat generating components and in particular the gear teeth which increases effectiveness of heat transfer to the air. The extraction fan is preferably placed at a location so that the trajectory of the air laps as much as possible the elements to be cooled. The presence of the deflector 20 upstream of the fan 14 prevents any direct projections of oil into the housing and makes it possible to retrieve most of the oil directly in the tank 4. The oil, which remains and reaches the wheel 15, is projected via centrifugal force onto the walls of the housing 17 and retrieved by the chute(s) 23 in the collecting pipe 22 and sent to the tank 4. The air pressure supplied by the fan favors this drainage. The oil/air mixture thus does not pass through a metallic intermediary, this being the case with conventional radiator type exchangers, which stop any exchange. The exchange device of the invention is thus more direct and faster. As a result of this exchange effectiveness, the flow of air required to evacuate a given calorific power is much smaller. This advantage is expressed by a lower weight of the cooling function; this weight gain is increased by adding to it cost reductions in terms of pipes, connectors and radiators. In addition, since the gearbox is no longer connected to oil or air pipes, the box is much easier to assemble or dismantle.

The device also has other advantages concerning safety. In fact, the risk of losing oil, which existed as regards a conventional external cooling circuit, now no longer exists. Secondly, the risks of leaks at the dynamic joints are reduced since the gearbox is in a partial vacuum. Finally, should all the oil be lost, the cooling function nevertheless remains and the possible period for functioning without oil is increased.

What is claimed is:

1. A method for cooling a mechanical reduction gear operatively connected within a gearbox which is connected to and openly communicating with an oil recovery tank whereby the reduction gear is lubricated by sprayed oil under pressure, the method comprising the steps of:
   admitting into the reduction gear a flow of previously filtered fresh air at ambient temperature;
   directing the air flow through the oil recovery tank and through the reduction gear in the gearbox so as to be mixed with the sprayed oil by being heated via direct exchange with the oil and via direct contact with reduction gear components which are heat generators;
   sucking up the air/oil mixture from outside of the gearbox and away from the reduction gear;
   purifying the air from the air/oil mixture; and
   rejecting the purified air away from the gearbox.

2. An integrated device for cooling a mechanical reduction gear operatively connected within a gearbox which is connected to and openly communicating with an oil recovery tank, the device comprising:
   at least one air intake equipped with filters, said air intake being connected so as to take in outside air through the filters into the gearbox;
   an airflow path defined to extend from said at least one air intake through the gearbox, through the oil recovery tank and to an airflow outlet of the gearbox, said airflow path being formed to communicate with the oil recovery tank so as to mix the outside air with oil spray therein;
   an extraction fan operatively connected to the airflow outlet of the gear box for sucking up the outside air mixed with the oil spray through said airflow path into the reduction gear wherein said extraction fan includes a wheel operatively connected so as to be driven by a kinematics chain of the reduction gear by means of a shaft; and
   means for collecting and draining the oil spray mixed with the outside air as the outside air passes through the oil recovery tank within said airflow path, said collecting and draining means being operatively located at least one of upstream and at a same level as said extraction fan.

3. A cooling device according to claim 2, wherein said air intake includes an intake casing directed downwards and with an orifice provided with a wide-meshed grate.

4. A cooling device according to claim 2, further comprising: an evacuation pipe for evacuating air to the outside from the gearbox, wherein said extraction fan includes a recovery housing surrounding the wheel and operatively connected between the gearbox and said evacuation pipe so as to allow communication therebetween.

5. A cooling device according to claim 2 further comprising: an oil collecting device having one centrifugal deflector mounted on the shaft inside the gearbox of the reduction gear and upstream of the wheel.

6. A cooling device according to claim 4, further comprising: an oil collecting and drainage device that includes an orifice provided at the bottom of the housing of said extraction fan, and a small collecting pipe connecting the housing with the oil recovery tank.

7. A cooling device according to claim 6, wherein the housing of said extraction fan includes a plurality of recovery chutes distributed at a lower portion of the housing connected so as to feed the collecting pipe.

* * * * *